United States Patent
Kuma

Patent Number: 5,484,352
Date of Patent: Jan. 16, 1996

[54] SWITCH FOR DETECTING OPERATION OF CONTROL VALVE SPOOL

[75] Inventor: Masaaki Kuma, Komatsu, Japan

[73] Assignee: Kabushiki Kaisha Komatsu Seisakusho, Tokyo, Japan

[21] Appl. No.: 66,082

[22] PCT Filed: Nov. 26, 1991

[86] PCT No.: PCT/JP91/01618

§ 371 Date: May 26, 1993

§ 102(e) Date: May 26, 1993

[87] PCT Pub. No.: WO92/09838

PCT Pub. Date: Jun. 11, 1992

[30] Foreign Application Priority Data

Nov. 30, 1990  [JP]  Japan .................................. 2-130436

[51] Int. Cl.$^6$ ................................................ F16H 61/12
[52] U.S. Cl. .................. 477/125; 60/406; 91/1; 137/554; 137/596.16; 477/906
[58] Field of Search .................... 91/1, 47, 513, 91/459; 60/399, 403, 406, 427; 477/125, 126, 906; 137/554, 596.16

[56] References Cited

U.S. PATENT DOCUMENTS

| | | | |
|---|---|---|---|
| 3,741,244 | 6/1973 | Ise | 137/554 |
| 3,896,280 | 7/1975 | Blake | 200/81.9 M |
| 4,567,791 | 2/1986 | Sato | 477/906 |
| 5,021,955 | 6/1991 | Ito et al. | 477/906 |

FOREIGN PATENT DOCUMENTS

| | | |
|---|---|---|
| 53-8479 | 1/1978 | Japan . |
| 60-59474 | 12/1985 | Japan . |
| 3-4084 | 1/1991 | Japan . |
| 10380 | 12/1988 | WIPO ................. 477/906 |

*Primary Examiner*—F. Daniel Lopez
*Attorney, Agent, or Firm*—Richards, Medlock & Andrews

[57] ABSTRACT

A detector switch of the present invention is capable of confirming that an electrical signal from a controller to an electromagnetic valve has been transformed into the operation of a control valve spool when the speed of a transmission of automobiles or construction machines is changed. To achieve this, in a transmission having control valves having a spool (3) for changing the hydraulic pressure of a transmission clutch, a controller (5) for turning ON and OFF electromagnetic valves ($2_1$, $2_2$, $2_3$,) the control valves ($1_1$, $1_2$, $1_3$) are provided with a detector switch (7) which is capable of transmitting a signal to the controller (5) when the spool (3) abuts against the switch (7).

10 Claims, 3 Drawing Sheets

SWITCH FOR DETECTING OPERATION OF CONTROL VALVE SPOOL

FIELD OF THE INVENTION

The present invention relates to a detector switch for confirming that a control valve spool, for switching the speed of the transmission of automobiles or construction machines or the like, is operating.

BACKGROUND ART

Figure 4:
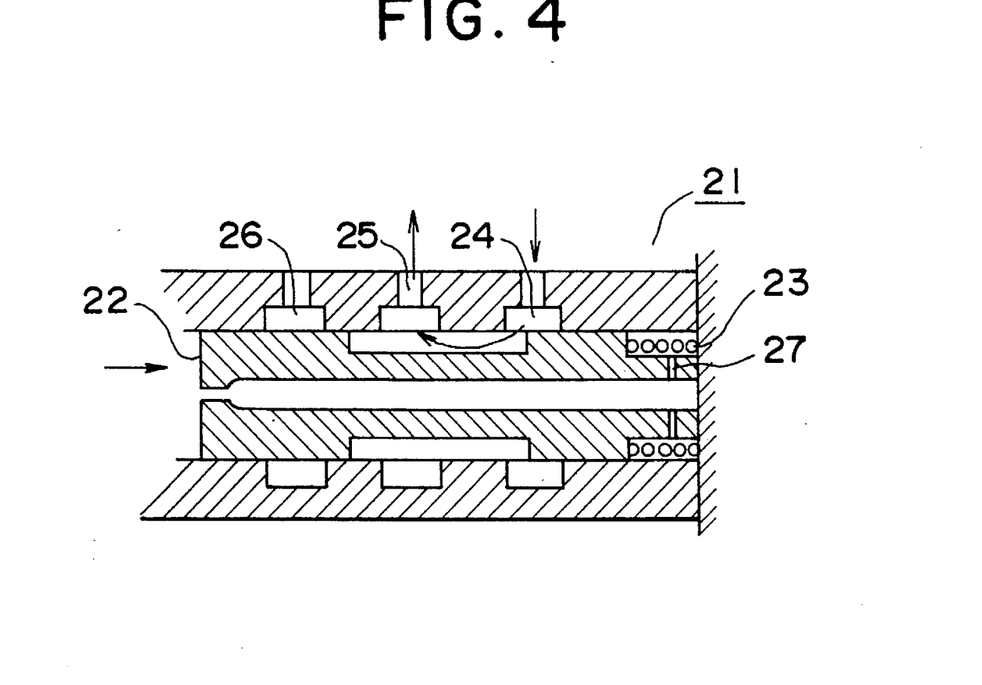
FIG. 4 is an explanatory view showing a pilot pressure acting on a conventional control valve spool.
Figure 5:
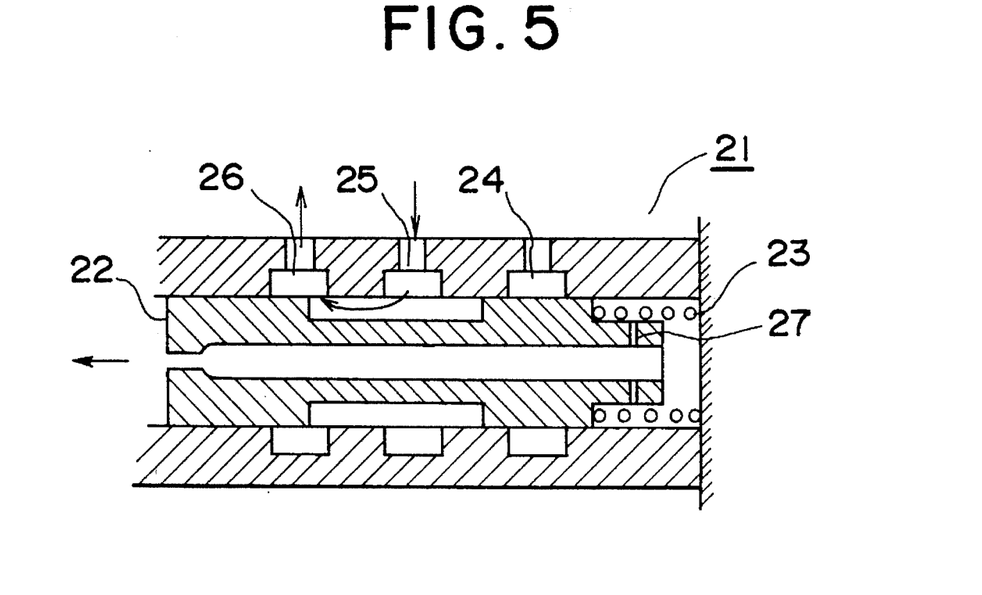
FIG. 5 is an explanatory view showing the pilot pressure not acting on the spool of FIG. 4.

Conventionally, in a transmission having a clutch with N speed stages, a control valve 21 is constructed, as shown in FIGS. 4 and 5, such that the N number of spools 22 and electromagnetic valves (not shown) are arranged so that each is connected to a corresponding clutch. An electrical signal is transmitted to the electromagnetic valves, and the spools 22 are switched by pilot pressure, thus changing the speed stages.

More specifically, when an electromagnetic valve is turned ON, the pilot pressure acts on the spool 22 against the force of a spring 23 so as to urge the spool to the right, as illustrated in FIG. 4. The hydraulic pressure from a pump (not shown) passes through the control valve 21 from a pump port 24 to a clutch port 25 and is transferred to a clutch (not shown), thus turning the clutch ON.

On the other hand, when an electromagnetic valve is turned OFF, the pilot pressure is reduced to nothing, and thus the spool 22 is pushed to the left by the force of the spring 23, as shown in FIG. 5. The hydraulic pressure of the clutch (not shown) passes through the control valve 21 from the clutch port 25 to a drain port 26 and is drained to an oil tank (not shown), thus turning the clutch OFF. It should be noted that a throttle 27 is arranged so that it communicates with the oil tank when an electromagnetic valve is OFF.

However, in such a conventional construction, when a signal is transmitted from the controller for switching an electromagnetic valve, the controller is not capable of detecting whether or not the spool is switched in response to the signal, thus causing the following problems.

(1) For instance, in a transmission including a low stage clutch and a second stage clutch, although an OFF signal is transmitted to the low stage electromagnetic valve and an ON signal is transmitted to the second stage electromagnetic valve for switching the transmission from low to second, the low stage spool is not always switched.

The reason can be, for example, that the spool or the electromagnetic valve is blocked with dust, or is stuck. In this case, the low stage clutch and the second stage clutch are both engaged, and thus the transmission is damaged.

(2) For example, although an ON signal is transmitted to the low stage electromagnetic valve, the spool is not operated due to a failure of the electromagnetic valve, and the low stage clutch is not turned ON. Even in this case, since the controller is not capable of recognizing an abnormality of the electromagnetic valve, it is necessary to manually operate a spool (hereinafter referred to as an emergency escape spool), which is capable of turning ON and OFF without employing the electromagnetic valve, when the failure is detected. It also takes time to carry out the emergency escape.

SUMMARY OF THE INVENTION

In view of the foregoing problems, it is an object of the present invention to provide a detector switch for detecting the operation of a control valve spool, which switch is capable of confirming that an electrical signal to an electromagnetic valve has been transformed into the operation of the spool, thus overcoming the drawbacks of the conventional art.

To achieve the above object, the present invention provides a detector switch for detecting the operation of a valve spool of a transmission control valve, the detector switch being fixed to an end of a valve member in the vicinity of an end of the control valve spool, and a controller for turning ON and OFF an electromagnetic valve connected to the control valve in order to change the hydraulic pressure in a transmission clutch, characterized in that the detector switch is capable of transmitting a signal to the controller when the control valve spool abuts against the detector switch in order to confirm that an electrical signal transmitted to the electromagnetic valve has been transformed into the operation of the control valve spool.

Further, the controller comprises a preventing function which prevents a double engagement when speed stages are changed such that in a case where the detector switches corresponding to two of the speed stages remain in an ON state simultaneously, the controller brings operations to an emergency stop and opens all of the transmission clutches, and a self-determining function which determines whether or not a signal transmitted to an electromagnetic valve accords with a signal received from its detector switch.

According to the above-mentioned construction, in the case where both of the low and second stage detector switches remain in an ON state simultaneously when the speed stage is changed from low to second, the operations are brought to an emergency stop and all the clutches are opened, thus a transmission can be prevented from being damaged.

Also, for instance, when the low stage detector switch is not turned ON although an ON instruction is transmitted to the low stage electromagnetic valve, it can be determined that the low stage electromagnetic valve or the low stage spool is blocked with dust or is stuck. Hence, a process of determining a failure by operating the emergency escape spool is not required. Even though the controller determines an abnormality of the low stage electromagnetic valve and thus makes a vehicle unable to be in motion at low gear, it selects the second stage electromagnetic valve, thus enabling the vehicle to be in motion.

THE BEST MODE FOR CARRYING OUT THE INVENTION

Figure 1:
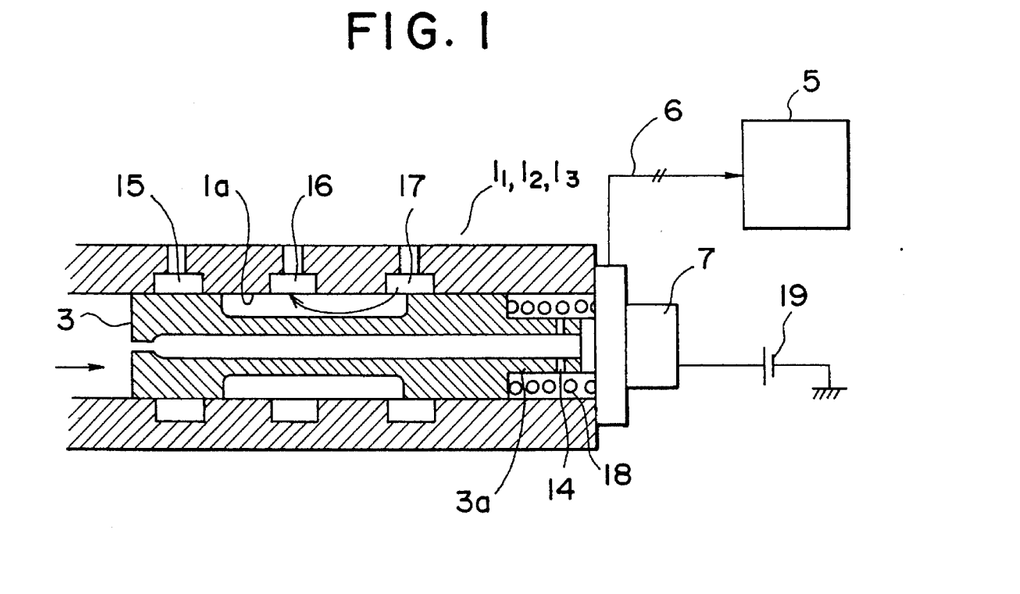
FIG. 1 is an explanatory view showing a detector switch for detecting an operation of a control valve spool according to the present invention, the switch being in an actuated state.
Figure 2:
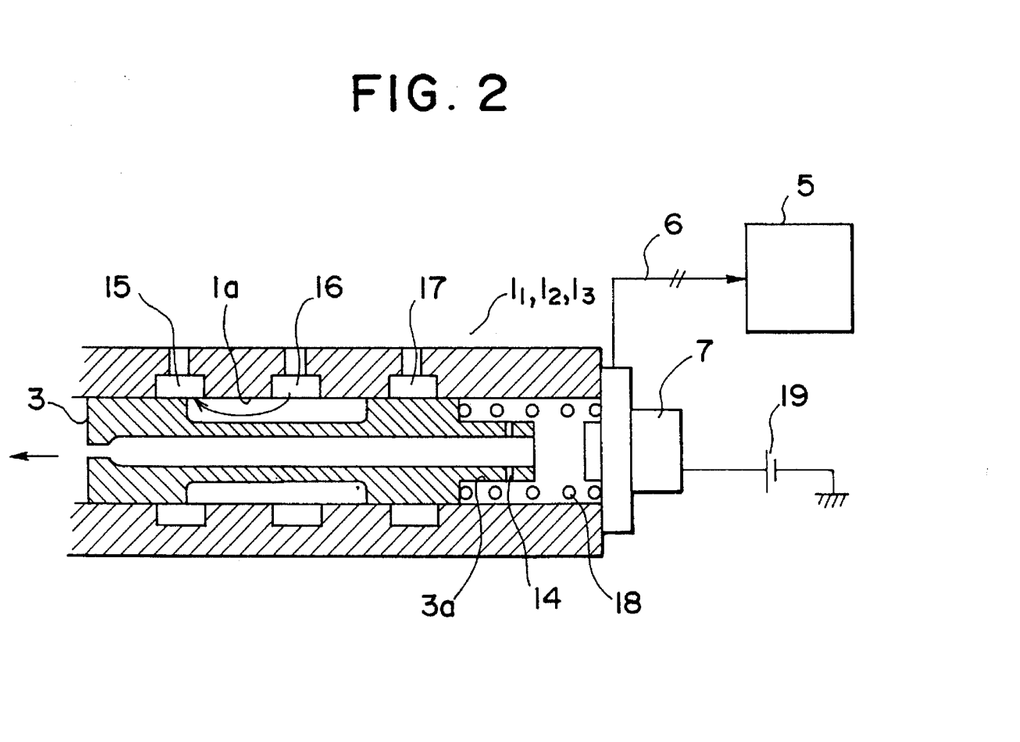
FIG. 2 is an explanatory view showing the detector switch of FIG. 1 being in non-actuated state.
Figure 3:
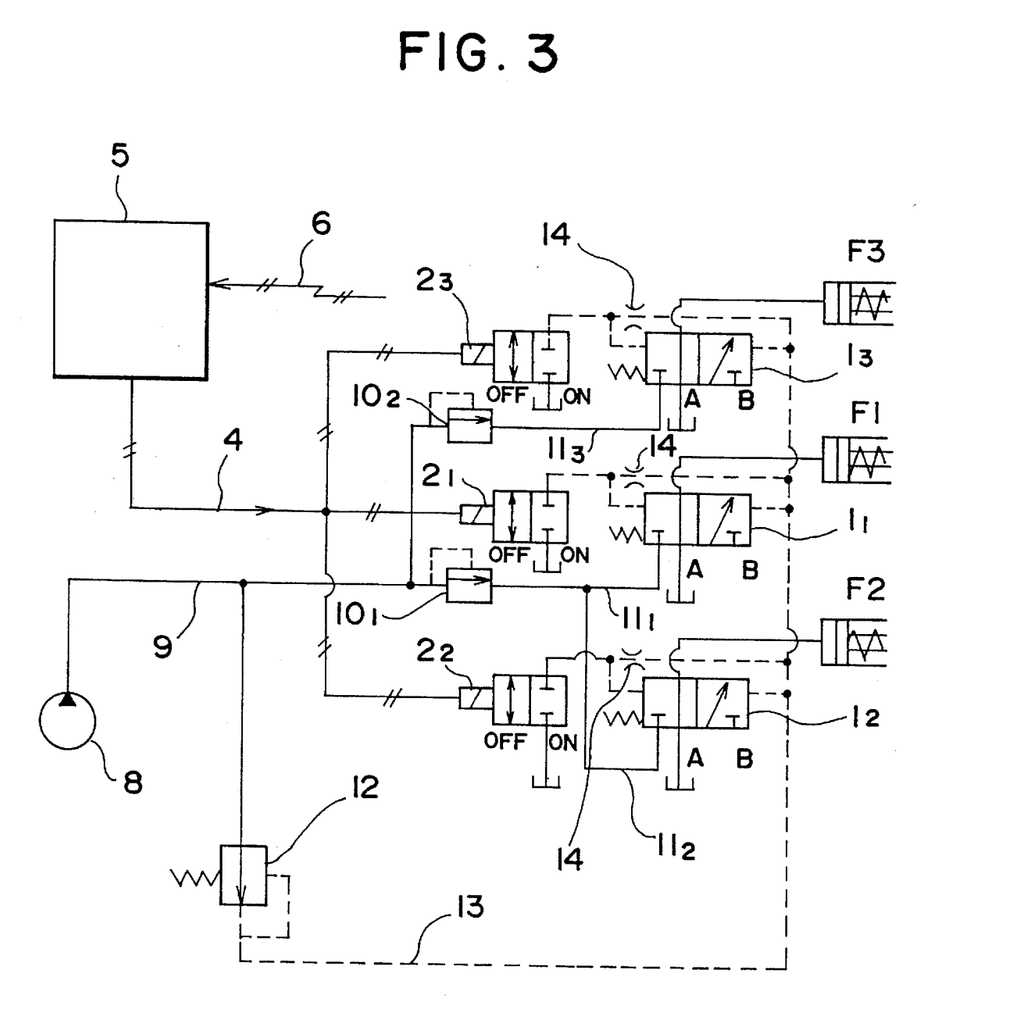
FIG. 3 is a hydraulic circuit diagram wherein the transmission speed stages selectable by an electrical switching-type control valve are from low to third.

An embodiment of the present invention will be described for a case where there are three clutches, that is, a low stage clutch $F_1$, a second stage clutch $F_2$, and a third stage clutch $F_3$, as shown in FIGS. 1–3.

A switch for detecting the operation of a control valve spool according to the present invention is constructed as follows. Each of the transmission control valves $1_1, 1_2, 1_3$, includes a spool 3. An electromagnetic valve $2_1, 2_2, 2_3$ is turned ON or OFF in response to an electrical signal from a controller 5 which actuates the spool 3 to switch the hydraulic pressure in the clutch. Each detector switch 7 is provided in the vicinity of the respective spool 3 for transmitting a signal 6 to the controller 5 for confirming that an electrical signal 4 applied to the respective electromagnetic valve $2_1, 2_2, 2_3$ has been transformed into the operation of the respective spool 3 when the respective spool 3 abuts against the respective detector switch 7.

A discharge circuit 9 of a pump 8 is interconnected to each control valve $1_1, 1_2, 1_3$ by branch circuits $11_1, 11_2, 11_3$ via relief valves $10_1, 10_2$. Each control valve $1_1, 1_2, 1_3$ is formed to be a two-position switching valve having positions A and B. When a control valve is placed at position A shown in FIG. 3, a pump discharge passage is closed and the clutch is connected to drain; on the other hand, when a control valve is switched to the position B, the pump discharge passage is communicated with the respective clutch $F_1, F_2, F_3$ so as to operate it.

The discharge circuit 9 of the pump 8 is diverged en route so as to form a pilot circuit 13 via a pilot valve 12. The pilot circuit 13 is interconnected to the positions A and B of each control valve $1_1, 1_2, 1_3$ and to the ON side of each electromagnetic valve $2_1, 2_2, 2_3$. When an electromagnetic valve $2_1, 2_2, 2_3$ is OFF, the pilot circuit 13 is communicated with the OFF side thereof, and the pilot pressure is reduced to nothing, thus disengaging the clutch. It should be noted that, in a case where only one electromagnetic valve $2_1$ is OFF, a throttle 14 is arranged in the pilot circuit 13 in order to prevent the pilot pressure of the other electromagnetic valves $2_2$ and $2_3$ from concurrently being reduced to nothing.

Each control valve $1_1, 1_2, 1_3$, has arranged therein a port 15 which communicates with a drain, a port 16 which communicates with the respective clutch $F_1, F_2, F_3$, and a port 17 which communicates with the pump 8. Also, each spool 3 is slidably fitted in an inner bore 1a of the valve member.

The pilot pressure of the pilot circuit 13 is applied to the left end of a spool 3 so as to force it to the right, as illustrated in FIG. 1. On the other hand, a portion having a narrow diameter $3a$ is formed on the right end of each spool 3, around which a spring 18 is fitted so as to urge the spool 3 to the left. The spring 18 is fitted such that the right end thereof abuts against an edge of the respective detector switch 7, which is disposed on the right end of the valve member.

A current flows through a detector switch 7 only when the detector switch 7 abuts against the spool 3, and is supplied by a battery 19 or the like. Due to the flow of the current, the signal 6 is transmitted to the controller 5, thereby confirming that the respective spool 3 is operated.

The controller 5 has the following functions. For example, if both of the low and second stage detector switches 7 remain in an ON state simultaneously for n seconds when the speed changes from low to second, the controller 5 brings the operations to an emergency stop and opens all of the clutches $F_1, F_2, F_3$, thereby precluding a double engagement. Thus, the transmission can be prevented from being damaged.

Further, when the signal 4 transmitted from the controller 5 does not accord with the signal 6 received from the respective detector switch 7, the controller 5 determines that the low stage electromagnetic valve $2_1$ or the low stage spool. 3 is blocked with dust or is stuck. For example, when the low stage detector switch 7 is not turned OFF although an OFF instruction is given to the low stage electromagnetic valve $2_1$, the controller 5 determines that the low stage electromagnetic valve $2_1$ or the low stage spool 3 is blocked with dust or is stuck.

Since the controller 5 is capable of determining at which electromagnetic valve or at which spool an abnormality occurs, a process of determining a failure by operating an emergency escape spool is not required. Also, even though the controller 5 determines an abnormality of the low stage electromagnetic valve $2_1$ and thus makes a vehicle unable to be in motion at low gear, it selects the second stage electromagnetic valve $2_2$, thus enabling the vehicle to be in motion.

INDUSTRIAL APPLICABILITY

The present invention is useful as a detector switch which is capable of confirming that an electrical signal from a controller to an electromagnetic valve has been transformed into an operation of a control valve spool when the speed of automobiles or construction machines is changed through a transmission.

I claim:

1. Apparatus comprising: a detector switch for detecting the operation of a valve spool of a transmission control valve, said detector switch being provided on said control valve adjacent to said spool, a controller for turning ON and OFF an electromagnetic valve connected to said control valve in order to change the hydraulic pressure in a transmission clutch, characterized in that said detector switch is capable of transmitting a signal to said controller when said valve spool abuts against said detector switch in order to confirm that an electrical signal transmitted to said electromagnetic valve has been transformed into the operation of said valve spool of said control valve; characterized in that said controller comprises a preventing function which prevents a double engagement when speed stages are changed such that in a case where the detector switches corresponding to the speed stages remain in an ON state simultaneously, said controller brings operations to an emergency stop and opens all the transmission clutches, and a self-determining function which determines whether or not a signal transmitted to an electromagnetic valve accords with a signal received from its detector switch.

2. Apparatus as claimed in claim 1, characterized in that said detector switch is connected both to a power supply and said controller, and said detector switch is fixed to a valve member of said control valve in the vicinity of an end of said valve spool.

3. A transmission control system comprising:

a plurality of hydraulic clutches, a plurality of control valves, each of said control valves being associated with a respective one of said hydraulic clutches, each of said control valves having a valve spool operatively positioned therein for movement between a first position and a second position, each of said control valves having a pump port, a clutch port and a drain port, a pump for providing hydraulic pressure, first conduit means connecting said pump to the pump port of each of said control valves, second conduit means connecting the clutch port of each control valve to a respective one of said hydraulic clutches, whereby in one of its positions each control valve connects its pump port to its clutch port to supply hydraulic pressure to its associated hydraulic clutch and in another of its positions connects its clutch port to its drain port to relieve the hydraulic pressure of its associated hydraulic clutch, a plurality of electromagnetic valves, each of said electromagnetic valves being associated with a respective one of said control valves, each electromagnetic valve having a first position and a second position, each electromagnetic valve being connected to its associated control valve for controlling the position of the valve spool of its associated control valve so that when an electromagnetic valve is in its first position the valve spool of its associated control valve should be in its first position and when said electromagnetic valve is in its second position the valve spool of said control valve should be in its second position, a controller for applying an electrical signal to a respective one of the electromagnetic valves such that said respective one of the electromagnetic valves assumes its first position in the presence of said electrical signal and assumes its second position in the absence of said electrical signal, a plurality of contact detectors, each of said detectors being associated with a respective one of said control valves for detecting the operation of the valve spool of its associated control valve, each respective detector being positioned adjacent to the valve spool of its associated control valve such that the valve spool of its associated control valve contacts the detector when the valve spool of its associated control valve is in its first position, each respective detector transmitting a signal to said controller when the valve spool of its associated control valve is in its first position in order to confirm that an electrical signal transmitted to an electromagnetic valve has been transformed into the operation of the valve spool of its associated control valve, whereby said controller determines whether an electrical signal transmitted to one of said electromagnetic valves accords with a signal received from the detector on the control valve associated with said one of said electromagnetic valves, and wherein when two of the detectors indicate that the two control valves associated with said two of the detectors are simultaneously supplying hydraulic pressure to the two hydraulic clutches associated with said two of the detectors, said controller opens all of the hydraulic clutches to thereby prevent simultaneous engagement of said two hydraulic clutches.

4. A transmission control system in accordance with claim 3, wherein each detector is connected between a power supply and said controller.

5. A transmission control system in accordance with claim 3, wherein each detector is mounted on its associated control valve in the vicinity of an end of the valve spool of its associated control valve.

6. A transmission control system in accordance with claim 5, wherein each detector comprises a switch which is actuated when said end of the valve spool of its associated control valve abuts the switch.

7. A transmission control system in accordance with claim 3, further comprising a source of pilot pressure connected to a first end of each of said control valves, wherein in one of its position each electromagnetic valve connects the first end of its associated control valve to a drain to reduce the pilot pressure on the first end of its associated control valve.

8. A transmission control system in accordance with claim 3, wherein each valve spool is slidably fitted in a bore of its control valve, wherein each detector is positioned adjacent an end of the valve spool of its associated control valve so that the respective detector is actuated when the valve spool of its associated control valve abuts said respective detector.

9. A transmission control system in accordance with claim 3, wherein each valve spool is slidably fitted in a bore of its control valve, wherein each detector is a detector switch positioned adjacent an end of the valve spool of its associated control valve so that the respective detector switch is actuated when said end of the valve spool of its associated control valve abuts said respective detector switch.

10. A transmission control system in accordance with claim 9, wherein each of said control valves is a two-position switching valve, and wherein each detector is connected between a power supply and said controller.

* * * * *

UNITED STATES PATENT AND TRADEMARK OFFICE
CERTIFICATE OF CORRECTION

PATENT NO. : 5,484,352

DATED : January 16, 1996

INVENTOR(S) : Kuma

It is certified that error appears in the above-identified patent and that said Letters Patent is hereby corrected as shown below:

The title page, showing the illustrative Figure should be deleted to be replaced with the attached title page.

In the drawings, sheets 1-3, consisting of Figs. 1-5 should be deleted to be replaced with the corrected sheets of drawings consisting of Figs. 1-5 as shown on the attached sheets.

Signed and Sealed this

Seventeenth Day of December, 1996

Attest:

BRUCE LEHMAN

*Attesting Officer*   *Commissioner of Patents and Trademarks*

United States Patent [19]

Kuma

[11] Patent Number: 5,484,352
[45] Date of Patent: Jan. 16, 1996

[54] SWITCH FOR DETECTING OPERATION OF CONTROL VALVE SPOOL

[75] Inventor: Masaaki Kuma, Komatsu, Japan

[73] Assignee: Kabushiki Kaisha Komatsu Seisakusho, Tokyo, Japan

[21] Appl. No.: 66,082

[22] PCT Filed: Nov. 26, 1991

[86] PCT No.: PCT/JP91/01618
§ 371 Date: May 26, 1993
§ 102(e) Date: May 26, 1993

[87] PCT Pub. No.: WO92/09838
PCT Pub. Date: Jun. 11, 1992

[30] Foreign Application Priority Data

Nov. 30, 1990 [JP] Japan ................ 2-130436

[51] Int. Cl.$^6$ ............................. F16H 61/12
[52] U.S. Cl. ................... 477/125; 60/406; 91/1; 137/554; 137/596.16; 477/906
[58] Field of Search .................... 91/1, 47, 513, 91/459; 60/399, 403, 406, 427; 477/125, 126, 906; 137/554, 596.16

[56] References Cited

U.S. PATENT DOCUMENTS

| | | | |
|---|---|---|---|
| 3,741,244 | 6/1973 | Ise | 137/554 |
| 3,896,280 | 7/1975 | Blake | 200/81.9 M |
| 4,567,791 | 2/1986 | Sato | 477/906 |
| 5,021,955 | 6/1991 | Ito et al. | 477/906 |

FOREIGN PATENT DOCUMENTS

| | | | |
|---|---|---|---|
| 53-8479 | 1/1978 | Japan . | |
| 60-59474 | 12/1985 | Japan . | |
| 3-4084 | 1/1991 | Japan . | |
| 10380 | 12/1988 | WIPO | 477/906 |

*Primary Examiner*—F. Daniel Lopez
*Attorney, Agent, or Firm*—Richards, Medlock & Andrews

[57] ABSTRACT

A detector switch of the present invention is capable of confirming that an electrical signal from a controller to an electromagnetic valve has been transformed into the operation of a control valve spool when the speed of a transmission of automobiles or construction machines is changed. To achieve this, in a transmission having control valves having a spool (3) for changing the hydraulic pressure of a transmission clutch, a controller (5) for turning ON and OFF electromagnetic valves ($2_1$, $2_2$, $2_3$,) the control valves ($1_1$, $1_2$, $1_3$) are provided with a detector switch (7) which is capable of transmitting a signal to the controller (5) when the spool (3) abuts against the switch (7).

10 Claims, 3 Drawing Sheets